United States Patent Office 3,096,310
Patented July 2, 1963

3,096,310
POLYMERIZATION PROCESS FOR POLYALLYLIC ESTERS
Charles A. Heiberger, Princeton, N.J., assignor to FMC Corporation, a corporation of Delaware
No Drawing. Filed May 22, 1959, Ser. No. 814,957
19 Claims. (Cl. 260—77.5)

This invention relates to an improved process for polymerizing unsaturated compounds, particularly compounds containing at least two unsaturated groups that are not conjugated with respect to carbon. This improved process provides a novel and effective means for controlling the polymerization of such compounds to produce fusible polymers having a relatively low molecular weight, which polymers are capable of further polymerization to infusible high molecular weight products. This application is a continuation-in-part of application Serial No. 575,362, filed April 2, 1956, now abandoned.

Heretofore, it has been necessary to control very carefully the polymerization of unsaturated compounds, especially poly-unsaturated compounds, when it is desired to arrest the polymerization at an intermediate stage. The preparation of relatively low molecular weight polymers has heretofore been achieved by limiting the conversion of monomer to polymer to very low values, or by extensively diluting or otherwise modifying the system, and even under such special conditions the reaction requires careful control to avoid the premature formation of an infusible gel. The particularly ready formation of an infusible gel from polyunsaturated compounds is due to the multiple unsaturation of the monomer, which tends to cause cross-linking even at a relatively low degree of polymerization. There is a continuing need for polymerization procedures whereby increased conversion of monomer to polymer may be obtained, yet keeping the molecular weight of the polymer sufficiently low that gelation does not occur.

An object of the present invention is to provide a novel and improved method for the preparation of relatively low molecular weight polymers of polyunsaturated monomers. Another object is to provide a method for controlling the molecular weight of these polymers within a range lower than was heretofore achieved. Another object is to provide a method for increasing the conversion of monomer to polymer which may be obtained before gelation occurs. Another object is to provide improved low molecular weight polymers which are more stable to storage and processing than heretofore. Other objects, and attendant advantages, will become apparent from the subsequent description of the invention.

A method has now been discovered for polymerizing polyunsaturated monomers to form fusible polymers of substantially lower molecular weight, and in much higher conversion of monomer to polymer, than heretofore. This is accomplished by using hydrogen peroxide as the polymerization catalyst under essentially anhydrous conditions; under such conditions, the hydrogen peroxide catalyst is found to behave not only as a polymerization intiator but also as a polymerization terminator. Using hydrogen peroxide in the system described herein, it is possible to achieve higher conversions than are obtained with conventional organic peroxide catalysts even under optimum conditions, yet at the same time controlling the molecular weight of the product in a substantially lower range than is obtained using typical organic peroxide catalysts.

On the other hand, when organic peroxides are used as catalysts, the degree of conversion of monomer to polymer that is obtainable before gelation to an infusible state occurs is substantially lower than the conversion obtained using the hydrogen peroxide catalyst disclosed herein. Low molecular weight products, using conventional organic peroxide catalysts, are obtained only by limiting the conversion to very low values; but even at very low conversions, with organic catalysts the polymers produced are of higher molecular weight than those resulting from the hydrogen peroxide catalysis of this invention. The cost of conventional organic peroxides, the presence of catalytic decomposition products which are detrimental to the color and to the electrical properties of the polymer, and the relative instability to gelation during storage, are additional disadvantages which are eliminated by the use of hydrogen peroxide.

As an additional aspect of this discovery, it has been found that, for certain applications, unique advantages may accrue from the use of a catalyst system containing both hydrogen peroxide and an organic peroxide, which advantages may outweigh such disadvantages as cost and color formation which may accompany the use of organic peroxides. These benefits are due to a combination of the molecular weight control obtained with hydrogen peroxide, and the more rapid initiation reaction of the organic peroxide.

As previously stated, the molecular weight of the polymer formed may be controlled merely by adjusting the concentration of hydrogen peroxide, and in most cases the desired results are achieved using hydrogen peroxide as the sole catalyst. But it has been discovered that, when hydrogen peroxide is used in conjunction with an organic peroxide, the effect of the hydrogen peroxide on the molecular weight predominates, yet the effect of any contaminants on the reaction rate is eliminated. That is, the presence of the organic peroxide does not inhibit the chain terminating behavior of the hydrogen peroxide; at the same time, the organic peroxide imparts the positive advantage of accelerating the overall polymerization reaction, since a longer induction period and a longer reaction time generally accompanies the use of pure hydrogen peroxide alone. Thus, the organic peroxide allows more precise control of the reaction rate, and the hydrogen peroxide provides a lower molecular weight product at higher conversions. Varying the ratios of organic and hydrogen peroxide also permits close control of the polymer properties, so that polymers of specific molecular weights may be obtained by using the appropriate combination of catalysts.

The process of this invention may be applied to the polymerization of compounds containing at least 2 polymerizable unsaturated groups, such as the unsaturated alcohol esters of polybasic acids and the unsaturated alcohol esters of unsaturated acids. Of particular interest are polyallylic esters of polycarboxylic acids, the polymers of which have found substantial utility. Representative polyunsaturated monomers include allylic esters such as the diallyl and dimethallyl orthophthalates, isophthalates, terephthalates, chlorophthalates, tetrahydrophthalates, hexahydrophthalates, maleates, itaconates, adipates, diglycollates, phenyl phosphonates, pinates, carbonates, azelates, cresyl phosphates, bicyclo(2,2,1)-5-heptene-2,3-dicarboxylates, bicyclo(2,2,1)-5-heptene-1,4,5,6, 7,7-hexachlor-2,3-dicarboxylates, and the like; other reactive monomers such as dicrotyl tetrahydrophthalate, triallyl citrate, triallyl phosphate, tetrakismethallyl dimethylxylylene diphosphonate, and the like; esters of unsaturated acids such as allyl crotonate, methallyl acid maleate, allyl acrylate, methallyl methacrylate, allyl butyl itoconate, 2-chlorallyl cinnamate, and the like; and others such as diallyl ether, methallyl acrylamide, triallyl cyanurate and isocyanurate, bis(methallyl)ether of ethylene glycol, and many other polyunsaturated compounds. These monomers may be homopolymerized, or copolymerized with each other or with mono-unsaturated compounds. Other additives may be present during the polymerization, for example coloring agents, fillers and mold release agents.

The polymerization reaction may be carried out in a variety of nonaqueous media, or in the absence of any diluent. Lower aliphatic alcohols, having about 5 or less carbon atoms, and aromatic hydrocarbons such as benzene, toluene, xylene, ethylbenzene and isopropyl benzene, are effective media. The proportion of diluent may be adjusted to vary the reflux temperature. For allylic esters of carboxylic acids, good results are obtained using a lower aliphatic alcohol, such as methanol, ethanol or isopropanol as solvent, at a concentration up to about 25% alcohol by weight of monomer, and preferably between about 5% and 15% by weight of monomer. With other monomers and solvents, other ratios may be used depending on such factors as the solubilities of monomer and polymer in the particular solvent and the degree conversion of polymer achieved. The solvent is used in such proportions that the reaction system remains homogeneous throughout the polymerization.

The concentration of the hydrogen peroxide used in the polymerization may vary from about 0.05% to 5% by weight of monomer, there being no significant advantage to the use of higher catalyst concentrations. A preferred range is usually about 0.1% to 1% of hydrogen peroxide by weight of monomer. Generally, for convenience, 50% aqueous hydrogen peroxide is used.

Hydrogen peroxide is generally slower reacting than conventional catalysts. The reaction rate may be accelerated by adding a promoter for the hydrogen peroxide, such as traces of iron, or an organic peroxide may be used as initiator, as discussed above. If an organic peroxide is used in combination with the hydrogen peroxide, the maximum total amount of peroxide present is generally about 5% by weight of monomer. But results are obtained when at least half of the total catalyst is hydrogen peroxide, although the beneficial results which characterize the use of hydrogen peroxide are observed at even lower ratios of hydrogen to organic peroxide.

Although very small amounts of water may actually be present in the system, such as that added with the catalyst or diluent, the total concentration of water in the system should be maintained below that at which separation of phases occurs during the reaction. This will of course vary with the nature and amount of organic solvent present, and the reaction conditions, but in general about one percent of water is the maximum amount which may be present before the effectiveness of the hydrogen peroxide is reduced. It is thus preferred to carry out the polymerization in the substantial absence of water.

The polymerizations proceed at temperatures ranging from about 85° to 200° C. or even higher. With diallylic phthalates, it is usually preferable to operate at temperatures between 105° and 120° C., although temperatures outside this range may also be used. The reaction is conveniently carried out under conditions of total reflux when an organic solvent is present, and the amount and nature of the solvent may be adjusted so as to determine the reflux temperature. A wide range of pressures may be used, but for convenience it is generally preferred to carry out the reaction at atmospheric pressure. The time required to complete the reaction will of course vary with these other conditions.

The hydrogen peroxide not only initiates the reaction but also controls the degree of polymerization, under the given conditions of concentration, temperature and pressure. The maximum conversion of monomer to polymer is limited by the degree of polymerization at which gelation takes place. With the diallylic phthalates in alcoholic media, it is preferred to stop the reaction when about 25 to 40 percent of monomer has been converted to polymer. With other monomers or solvents, other conversion ranges may be preferred. For economical operation, higher conversions mean that less monomer must be recovered and recycled. The converted polymer is separated from unreacted monomer and residual solvent by standard procedures, such as stripping off volatile components, dissolving unreacted monomer in an appropriate solvent, or extracting monomer from polymer as described in United States patent application Serial No. 575,361, filed April 2, 1956.

The number average molecular weight of the polymer formed by this process is normally less than 25,000, and generally below 10,000. The product is a solid, thermoplastic polymer containing residual unsaturation, which may readily be further polymerized to form a crosslinked, thermosetting resin.

Further aspects of the process of this invention are illustrated by the following examples and tables, in which proportions of ingredients are expressed in parts by weight unless otherwise noted.

Table 1 below demonstrates the effect of hydrogen peroxide concentration in the polymerization mixture on the average molecular weight of the polymer obtained, and also on the yield of polymer. The molecular weight is measured by and proportional to the precipitated polymer viscosity (PPV), which is the viscosity measured at 25° C. of a 25.0% solution of polymer in monomer. The yield of polymer is represented as the percent conversion of monomer to polymer. The monomer in Table 1 is diallyl phthalate. These data represent results of four separate runs at different catalyst concentrations, other conditions remaining constant.

TABLE 1.—EFFECT OF CATALYST CONCENTRATION: POLYMERIZATION WITH HYDROGEN PEROXIDE

|  | I | II | III | IV |
|---|---|---|---|---|
| Percent Hydrogen Peroxide | 0.11 | 0.27 | 0.51 | 0.54 |
| Percent Conversion | 24.5 | 25.8 | 28.0 | 29.3 |
| PPV, cps. at 25° C | 550 | 390 | 220 | 179 |

Table 1 shows that, as the hydrogen peroxide concentration increases, the precipitated polymer viscosity (PPV) decreases, the molecular weight of the polymer decreasing proportionally. Comparing runs II and IV above, for example, shows that doubling the hydrogen peroxide concentration roughly halves the PPV; and in general, changing the catalyst concentration is seen to have a significant effect on the PPV.

For purposes of comparison, Table 2 below shows the results of comparable diallyl phthalate polymerization reactions using a typical organic catalyst, tert.-butyl perbenzoate:

TABLE 2.—EFFECT OF CATALYST CONCENTRATION: POLYMERIZATION WITH TERT.-BUTYL PERBENZOATE

|  | I | II |
|---|---|---|
| Percent tert.-Butyl Perbenzoate | 0.27 | 0.50 |
| Percent Conversion | 25.0 | 25.5 |
| PPV, cps. at 25° C | 885 | 905 |

In Table 2, it is seen that doubling the catalyst concentration does not have a significant effect on the PPV of the product, and if anything increases the PPV, as compared with the substantial decrease in PPV obtained with increased hydrogen peroxide.

Table 2 illustrates both the difficulty of controlling the molecular weight of the product, and the substantially higher PPV of the product obtained using an organic catalyst. The use of hydrogen peroxide catalyst not only results in a lower PPV, and therefore a lower molecular weight polymer, but these are obtained at higher conversions of monomer to polymer.

If both an organic polymerization catalyst and hydrogen peroxide are present in the same reaction mixture, the regulating effect of the hydrogen peroxide predominates, as shown in Table 3. As the hydrogen peroxide concentration is increased, at constant tert.-butyl hydroperoxide concentration (runs I, II, and III), there is observed a corresponding decrease in the PPV, similar to that observed in Table 1 for hydrogen peroxide in the absence of an organic peroxide. The molecular weight regulating effect of the hydrogen peroxide is operative even in the presence of an organic peroxide. On the other hand, if the tert.-butyl hydroperoxide concentration is decreased, as shown in column IV of Table 3, the PPV of the product decreases also, thereby showing an opposite effect from the effect of hydrogen peroxide.

TABLE 3.—POLYMERIZATION WITH HYDROGEN PEROXIDE AND TERT.-BUTYL HYDROPEROXIDE

|  | I | II | III | IV |
|---|---|---|---|---|
| Percent tert.-Butyl Hydroperoxide | 0.25 | 0.25 | 0.25 | 0.10 |
| Percent Hydrogen Peroxide | 0.50 | 0.25 | 0.125 | 0.125 |
| Percent Conversion | 27 | 28 | 27 | 28 |
| PPV, cps. at 25° C | 235 | 405 | 530 | 405 |

Table 3 shows that increased hydrogen peroxide at constant organic peroxide lowers the PPV, and increased organic peroxide at constant hydrogen peroxide raises the PPV. By combining organic peroxides with hydrogen peroxide in various proportions, the molecular weight of the polymer may be controlled within a desired range which is substantially lower than that obtainable with an organic peroxide alone, simultaneously increasing the conversion obtainable before gelation occurs. Since the reaction rate is accelerated by the presence of an organic peroxide, such a combined catalyst system may also be preferred for practical considerations.

In carrying out the polymerization reaction, the amount of water present must be limited. Table 4 below shows the effect of water on the polymerization of diallyl phthalate, using ethanol as diluent and a constant hydrogen peroxide concentration:

TABLE 4.—EFFECT OF WATER ON POLYMERIZATION WITH HYDROGEN PEROXIDE

|  | I | II | III | IV |
|---|---|---|---|---|
| Percent Water | 0.058 | 0.72 | 1.22 | 1.72 |
| Percent Ethanol | 3.1 | 3.1 | 3.1 | 3.1 |
| Percent Hydrogen Peroxide | 0.5 | 0.5 | 0.5 | 0.5 |
| Percent Conversion | 25.2 | 30.0 | 29.9 | <10 |
| Final dope viscosity, cps | 435 | 549 | 497 | 75 |
| PPV, cps. at 25° C | 280 | 235 | 195 |  |

It is seen in runs I to III that, as the water concentration increased from 0.06% to 1.22%, the PPV decreased; but good conversions were obtained, and the reaction systems were essentially homogeneous throughout the polymerization. At 1.7% water in run IV, the polymerization reaction proceeded very slowly and stopped at a conversion of less than 10%, and the PPV was very low. Separation of phases occurred during run IV. To achieve full benefit of the hydrogen peroxide an essentially homogeneous system throughout the reaction is necessary, such as is obtained in the substantial absence of water. The system need not be absolutely dry, and the maximum water content which may be tolerated before separation of phases occurs during the reaction will of course vary with the nature and concentration of the diluent, the reaction temperature, the percent conversion and other reaction conditions. This maximum is usually in the range of 1 to 2 percent water.

In Table 5 is compared the effect of various types of diluents on the polymerization of diallyl phthalate:

TABLE 5.—EFFECT OF DILUENT ON CONVERSION

|  | Water | Isopropanol | Benzene |
|---|---|---|---|
| Percent Diluent | 10.0 | 10.7 | 20.0 |
| Percent Hydrogen Peroxide | 5.0 | 0.13 | 5.0 |
| Percent Conversion | 3.3 | 24.5 | 16.2 |

It is seen from Table 5 that, even at 5% hydrogen peroxide, the conversion of monomer to polymer is substantially lower in water than in either benzene or isopropanol. It is seen also that best results are obtained in isopropanol, where good conversion is obtained at 0.13% hydrogen peroxide; if the hydrogen peroxide concentration is increased to 0.54% in isopropanol, the yield is increased to 40%. This is a substantially higher conversion than is obtainable without gelation to an infusible state using conventional organic catalysts.

The following examples illustrate polymerization processes embodying the novel method of polymerization disclosed herein. All parts are by weight unless otherwise indicated.

*Example I*

To prepare a low molecular weight polymer of diallyl phthalate, 8860 pounds of monomer, 622 pounds of isopropanol (91% by volume) and 75 pounds of hydrogen peroxide (50.4% $H_2O_2$) were charged to a 1500 gallon stainless steel reactor, thoroughly agitated and heated to a pot temperature of 104–108° C. at total reflux. After 10 hours the viscosity of the reaction mixture had increased to 27 cps. at 106° C., as measured by a Bendix Ultraviscoson computator. The batch was cooled, to obtain a reaction product having a viscosity of 425 cps. at 25° C. This polymeric reaction product, which consists of approximately 27% polymer, 67% unreacted monomer and 6% isopropanol, was mixed intimately with 48,000 pounds of isopropanol (91% by volume), and the converted polymer precipitated at 0° C. The solid polymer was separated by filtration and dried, to yield a 27.6% conversion of monomer to polymer. Properties of a polymer obtained by this process are:

PPV, cps. at 25° C. _____ 354
Softening range, ° C. _____ 80–105
Iodine No. _____ 55
Sp. gr. at 25° C. (ASTM D792–50) _____ 1.267

The product is a thermoplastic solid possessing residual unsaturation. It is readily soluble in low molecular weight ketones, benzene, ethyl acetate and other solvents, and insoluble in alcohols, water and aliphatic hydrocarbons. The product was mixed with 2% by weight of tert.-butyl perbenzoate, and cured by heating for 15 minutes at 175° C. and 6000 p.s.i., to form an insoluble, thermoset resin having a Rockwell hardness (M scale) of 114–116, flexural strength of 9000 p.s.i. and heat distortion point at 264 p.s.i. of 155° C.

*Example II*

Polydimethallyl phthalate was prepared by charging 100 parts of dimethallyl orthophthalate, 8 parts of isopropanol (91% by volume) and 1.0 part of 50% hydrogen peroxide to a reactor. The mixture was agitated and heated to reflux at 112–116° C. After 30 hours, the viscosity of the reaction mixture had increased to 215 cps., measured at 25° C. The polymer was precipitated with methanol, and dried to give a 20% yield of solid resin having a PPV of 220 cps. at 25° C., measured as a 25% solution in diallyl phthalate. This polymer was cured by mixing with 2% tert.-butyl perbenzoate and heating for 15 minutes at 175° C. and 6000 p.s.i., to a thermoset resin having a Rockwell hardness of 110 on the M scale and a heat distortion point at 264 p.s.i. of 139° C.

Repeating the above polymerization, using in addition to the hydrogen peroxide catalyst 0.25 part of tert.-butyl perbenzoate, produced after 24 hours at 112–115° C. a 21% yield of product having a PPV of 250 cps. at 25° C., measured as a 25% solution in diallyl phthalate. The shortened reaction time was accompanied by no substantial increase in PPV.

*Example III*

A copolymer was prepared by reacting a mixture of 185 parts of diallyl phthalate, 187 parts of triallyl cyanurate, 45 parts of isopropanol (91% by volume) and 3.7 parts of 50% aqueous hydrogn peroxide for 4.3 hours at 110° C., following the procedure of Example I. A 31.5% yield of a solid polymer was obtained, having the following properties:

PPV, cps. at 25° C. _____ 1250 (in diallyl phthalate).
Melting range _____ 100–120° C.
Saponification No. _____ 308.

A clear infusible disc was readily prepared from this copolymer by curing with 2% tert.-butyl perbenzoate at a temperature of 175° C. and 6000 p.s.i. for 15 minutes.

*Example IV*

Diallyl adipate was polymerized as follows: One hundred parts of diallyl adipate, 8 parts of isopropanol (99% by volume) and 1 part of hydrogen peroxide, added as a 50% aqueous solution, were charged to a reactor, agitated and refluxed at 108–109° C. for 21.5 hours, at which time the viscosity of the reaction mixture was 0.65 cps., measured at 25° C. After cooling, the polymer was precipitated with methanol, and dried to yield a solid resin having a PPV of 93 cps. at 25° C. This resin was mixed with 2% tert.-butyl perbenzoate and cured for 15 minutes at 310° F. and 6000 p.s.i., to produce a thermoset resin having a Rockwell hardness (M scale) of 77.

Repeating the above experiment but replacing the hydrogen peroxide catalyst with 1 part of tert.-butyl perbenzoate, gave the following results: the reaction mixture reached a viscosity of 0.65 cps. at 25° C. after 3.25 hours; and the PPV of the final product was 565 cps. at 25° C. This higher PPV was reached at a lower conversion of monomer to polymer than was obtained with the hydrogen peroxide catalyst.

*Example V*

Diallyl bicyclo(2,2,1)-5-heptene-1,4,5,6,7,7-hexachlor-2,3-dicarboxylate was polymerized as follows: One hundried parts of this monomer, 8.4 parts of isopropanol (99% by volume) and 0.075 part of hydrogen peroxide, added as a 50% aqueous solution, were charged to a reactor, agitated and refluxed at 108–109° C. for 2.8 hours. The viscosity of the reaction mixture was 300 cps., measured at 25° C. The mixture was cooled, the polymer was precipitated with methanol, and dried to produce a solid resin having a PPV of 12 poises at 70° C., measured as a 25% solution of polymer in monomer. A disk cured with 2% tert.-butyl perbenzoate for 15 minutes at 310° F. and 6000 p.s.i. exhibitd a heat distortion point above 200° C.

Repeating the above experiment but replacing the hydrogen peroxide catalyst with 0.075 part of tert.-butyl perbenzoate, gave the following results: the reaction mixture reached a viscosity of 300 cps. after 3.8 hours; and the PPV of the final product was 196 poises at 70° C., measured as a 25% solution of polymer in monomer.

*Example VI*

Dimethallyl isophthalate was polymerized as follows: One hundred parts of dimethallyl isophthalate, 8.4 parts of isopropanol (99% by volume) and 0.376 part of hydrogen peroxide, added as a 50% aqueous solution, were charged to a reactor, agitated and refluxed at 108–109° C. for 27 hours. The viscosity of the reaction mixture was 400 cps., measured at 25° C. The mixture was cooled, the polymer was precipitated with methanol, and dried to produce a solid resin having a PPV of 214 cps. at 25° C., measured as a 25% solution in diallyl phthalate. A cured sample of this resin exhibited a Rockwell hardness (M scale) of 117 and a heat distortion at 264 p.s.i. of 4 mils at 225° C.

Repeating the above experiment, replacing the hydrogen peroxide catalyst with 0.376 part of tert.-butyl perbenzoate, gave the following results: the reaction mixture reached a viscosity of 300 cps. after 3.7 hours, and the PPV in diallyl phthalate of the final product was 628 cps. at 25° C.

*Example VII*

Diallyl bicyclo(2,2,1)-5-heptene-2,3-dicarboxylate was polymerized as follows: One hundred parts of monomer, 8 parts of isopropanol (99% by volume) and 0.37 part of hydrogen peroxide, added as a 50% aqueous solution, were charged to a reactor, agitated and refluxed at 108–109° C. for 20.7 hours, at which time the viscosity of the reaction mixture was 300 cps., measured at 25° C. The mixture was cooled, the polymer was precipitated with methanol, and dried to produce a solid resin having a PPV of 445.5 cps. at 25° C., measured as a 25% solution in diallyl phthalate.

Repeating the above experiment, replacing the hydrogen peroxide with 0.37 part of tert.-butyl perbenzoate, gave the following results: the reaction mixture reached a viscosity of 300 cps. after 5.75 hours; and the PPV in diallyl phthalate of the final product was 705.5 cps. at 25° C.

*Example VIII*

Two hundred and twenty-two parts of diallyl phthalate monomer, 2.22 parts of 50% hydrogen peroxide, and 31 parts of methanol, were polymerized at 110–115° C. for 2 hours at a pressure of 50 p.s.i. A 27% yield was obtained of a polymer having a PPV of 315 cps. at 25° C., and a melting range of 80–105° C.

*Example IX*

Five hundred parts of diallyl phthalate monomer, 5.0 parts of 50% hydrogen peroxide, and 125 parts of isobutanol, were polymerized at 122° C. for 8 hours at atmospheric pressure. A 33% yield of polydiallyl phthalate was obtained, having a PPV of 275 cps. at 25° C.

*Example X*

One hundred parts of diallyl phthalate monomer, 5.0 parts of 50% hydrogen peroxide, and 100 parts xylene, were refluxed for 10 hours at 150° C. A 21.5% yield of polydiallyl phthalate was obtained, having a PPV of 215 cps. at 25° C. and a melting range of 105–130° C. A higher concentration of hydrogen peroxide was necessary here in order to obtain practical yields of polymer.

*Example XI*

One hundred parts of diallyl phthalate monomer, 5.0 parts of 50% hydrogen peroxide, and 100 parts isopropyl benzene were refluxed for 10 hours at 165° C. A 42% yield of polymer was obtained, having a PPV of 290 cps. at 25° C.

*Example XII*

One hundred parts of diallyl phthalate monomer, 1.0 part of 50% hydrogen peroxide and 25 parts isopropyl benzene were refluxed for 1.5 hours at 170–187° C. A 46% yield of polymer was obtained, having a PPV of 540 cps. at 25° C.

It is apparent that this invention is susceptible to numerous modifications within the scope of the disclosure, and it is intended to include such variations within the scope of the following claims.

I claim:

1. The process of polymerizing to a fusible polymer capable of further polymerization a monomeric polyallylic ester selected from the group consisting of allyl and methallyl esters of a polybasic organic acid, comprising polymerizing said monomer in a homogeneous system with a catalytic amount of hydrogen peroxide, wherein the maximum amount of water present in the reaction system is that which is completely miscible with the reaction system throughout the polymerization reaction, said reaction system remaining homogeneous throughout the polymerization reaction, said maximum amount of water comprising about 1% of the reaction system.

2. The process of claim 1, wherein said monomer is a diallyl ester of a dicarboxylic acid.

3. The process of claim 1, wherein said monomer is a dimethallyl ester of a dicarboxylic acid.

4. The process of claim 1, wherein said monomer is diallyl adipate.

5. The process of claim 1, wherein said monomer is a diallyl ester of a bicyclo dicarboxylic acid.

6. The process of claim 1, wherein said monomer is diallyl bicyclo(2,2,1)-5-heptene-1,4,5,6,7,7,-hexachlor-2,3-dicarboxylate.

7. The process of claim 1, wherein said monomer is diallyl bicyclo(2,2,1)-5-heptene-2,3-dicarboxylate.

8. The process of claim 1, wherein said monomer is diallyl phthalate.

9. The process of claim 1, wherein said monomer is dimethallyl phthalate.

10. The process of polymerizing to a fusible copolymer capable of further polymerization a mixture of monomeric polyallylic esters selected from the group consisting of allyl and methallyl esters of polybasic organic acids, comprising copolymerizing said monomers in a homogeneous system with a catalytic amount of hydrogen peroxide, wherein the maximum amount of water present in the reaction system is that which is completely miscible with the reaction system throughout the polymerization reaction, said reaction system remaining homogeneous throughout the polymerization reaction, said maximum amount of water comprising about 1% of the reaction system.

11. The process of claim 10, wherein at least one of said monomers is a diallyl phthalate.

12. The process of claim 10, wherein said mixture of monomers consists of diallyl phthalate and triallyl cyanurate.

13. The process of polymerizing to a fusible polymer capable of further polymerization a monomeric diallylic ester selected from the group consisting of allyl and methallyl esters of dicarboxylic acids, comprising diluting said monomer with 0–50% of an organic solvent for said monomer and polymerizing said monomer in a homogeneous system with about 0.05–5%, by weight of monomer, of hydrogen peroxide catalyst, at a temperature of about 85–200° C., wherein the maximum amount of water present in the reaction system is that which is completely miscible with the reaction system throughout the polymerization reaction, said reaction system remaining homogeneous throughout the polymerization reaction.

14. The process of claim 13, wherein said organic solvent for the monomer is selected from the group consisting of lower aliphatic alcohols, benzene and alkyl benzenes.

15. The process of polymerizing a diallyl phthalate monomer to a fusible polymer capable of further polymerization, comprising diluting said monomer with about 5–15% of a lower aliphatic alcohol, and polymerizing said monomer in a homogeneous system with about 0.1–1.0%, by weight of monomer, of hydrogen peroxide catalyst, at a temperature of abuot 105–120° C., wherein the maximum amount of water present in the reaction system is that which is completely miscible with the reaction system throughout the polymerization reaction, said reaction system remaining homogeneous throughout the polymerization reaction, said maximum amount of water comprising about 1% of the reaction system.

16. The process of polymerizing a dimethallyl phthalate monomer to a fusible polymer capable of further polymerization, comprising diluting said monomer with about 5–15% of a lower aliphatic alcohol, and polymerizing said monomer in a homogeneous system with about 0.1–1.0%, by weight of monomer, of hydrogen peroxide catalyst, at a temperature of about 105–120° C., wherein the maximum amount of water present in the reaction system is that which is completely miscible with the reaction system throughout the polymerization reaction, said reaction system remaining homogeneous throughout the polymerization reaction, said maximum amount of water comprising about 1% of the reaction system.

17. The process of polymerizing to a fusible polymer capable of further polymerization a monomeric diallylic ester selected from the group consisting of allyl and methallyl esters of dicarboxylic acids, comprising diluting said monomer with 0–50% of an organic solvent for said monomer and polymerizing said monomer in a homogeneous system with about 0.05–5%, by weight of monomer, of a mixture of peroxide catalysts consisting of an effective proportion of hydrogen peroxide in combination with an effective proportion of an organic peroxide, at a temperature of about 85–200° C., wherein the maximum amount of water present in the reaction system is that which is completely miscible with the reaction system throughout the polymerization reaction, said reaction system remaining homogeneous throughout the polymerization reaction, said maximum amount of water comprising about 1% of the reaction system.

18. The process of claim 17, wherein said mixture of peroxide catalysts contains at least 50% hydrogen peroxide.

19. The process of claim 18, wherein the monomer is a diallyl phthalate.

References Cited in the file of this patent

UNITED STATES PATENTS

| 2,273,891 | Pollack et al. | Feb. 24, 1942 |
| 2,440,318 | White et al. | Apr. 27, 1948 |
| 2,501,610 | Morris et al. | Mar. 21, 1950 |
| 2,595,852 | Hopper et al. | May 6, 1952 |
| 2,612,491 | Evans et al. | Sept. 30, 1952 |
| 2,662,878 | Bryant | Dec. 15, 1953 |
| 2,709,162 | Luce | May 24, 1955 |

UNITED STATES PATENT OFFICE
CERTIFICATE OF CORRECTION

Patent No. 3,096,310     July 2, 1963

Charles A. Heiberger

It is hereby certified that error appears in the above numbered patent requiring correction and that the said Letters Patent should read as corrected below.

Column 7, line 58, for "exhititd" read -- exhibited --; column 9, line 19, for "1,4,5,6,7,7,-hexachlor" read -- 1,4,5,6, 7,7-hexachlor --; column 9, line 58, after "reaction" insert --, said maximum amount of water comprising about 1% of the reaction system --; column 10, line 7, for "abuot" read -- about --.

Signed and sealed this 14th day of January 1964.

(SEAL)
Attest:
ERNEST W. SWIDER

EDWIN L. REYNOLDS

Attesting Officer

Acting Commissioner of Patents